No. 790,477. PATENTED MAY 23, 1905.
C. E. BÖRNER.
TOOL HANDLE.
APPLICATION FILED OCT. 26, 1901.

Witnesses:
F. E. Manning.
Harold Lewis.

Inventor:
Carl E. Börner.
By Knight Bros
attys.

No. 790,477. Patented May 23, 1905.

UNITED STATES PATENT OFFICE.

CARL EMIL BÖRNER, OF CHEMNITZ, GERMANY.

TOOL-HANDLE.

SPECIFICATION forming part of Letters Patent No. 790,477, dated May 23, 1905.

Application filed October 26, 1901. Serial No. 80,111.

*To all whom it may concern:*

Be it known that I, CARL EMIL BÖRNER, a subject of the King of Saxony, residing at Chemnitz, in the Kingdom of Saxony, Germany, have invented certain new and useful Improvements in Tool-Handles, of which the following is a specification.

This invention relates to tool-handles; and it has for its object to provide a tool-handle which will be inexpensive to manufacture and will be strong and durable.

With these and other objects in view the invention consists in certain parts and combinations of parts, as will be more fully hereinafter described, and pointed out in the appended claim.

Figure 1:
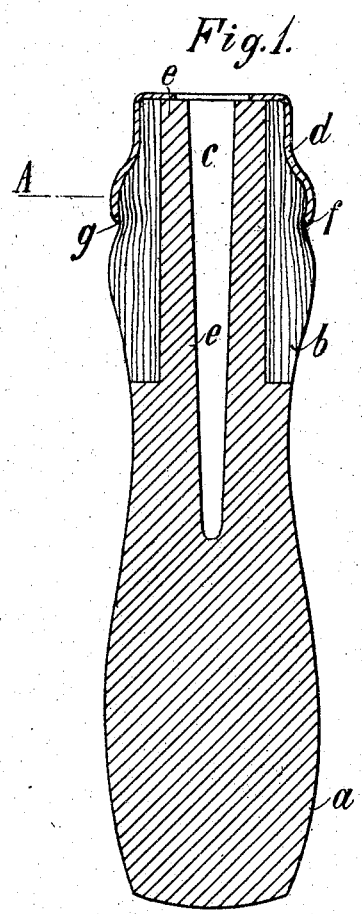
Figure 2:
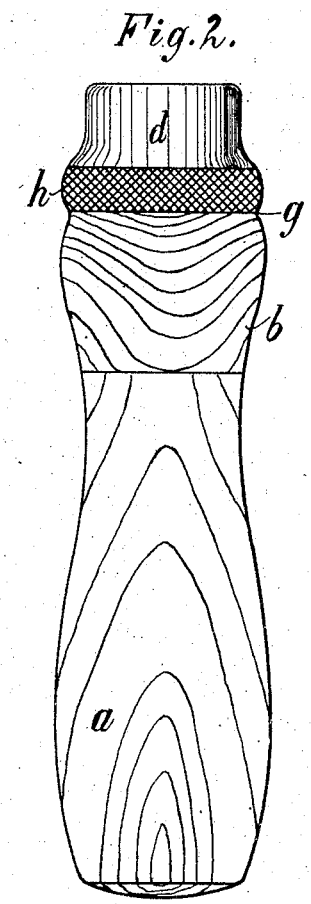
Figure 3:
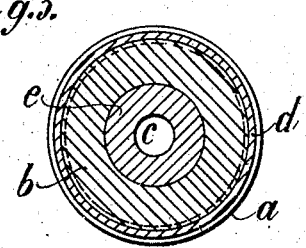
Figure 4:

In the drawings forming a part of this specification, Figure 1 is a longitudinal section of the handle. Fig. 2 is a side view. Fig. 3 is a transverse section on the line A, Fig. 1; and Fig. 4 is a detail showing the form which the collar of papier-mâché takes when the ferrule is placed upon the handle.

The handle *a*, having a socket *c*, is reduced to one end and has mounted upon said reduced portion a collar *b*, made of papier-mâché. A metallic ferrule *d*, provided with a contracted mouth *f*, is fitted upon the papier-mâché while the mass is in a partly-moist condition, so as not to cut into or to destroy the fiber of the material. The papier-mâché being when dry very tough and at the time having a certain amount of elasticity, the handle is prevented from splitting when a tool is driven therein.

Having thus described the invention, the following is what is claimed as new therein:

A handle for tools comprising a papier-mâché collar fitted at one end thereof and a ferrule provided with a contracted mouth bent into the papier-mâché, compressing the same to form a groove.

In testimony whereof I affix my signature in presence of two witnesses.

CARL EMIL BÖRNER.

Witnesses:
MORRIS LIPMAN,
H. THIELE.